United States Patent
Nelin et al.

(10) Patent No.: US 7,975,258 B2
(45) Date of Patent: *Jul. 5, 2011

(54) TESTING ENVIRONMENT FOR DATABASE SERVER SIDE LOGIC

(75) Inventors: Constance J. Nelin, Austin, TX (US); Tanya Couch, San Jose, CA (US); Abdul H. Al-Azzawe, San Jose, CA (US); Frederick T. Sharp, Menlo Park, CA (US); Tom R. Christopher, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 516 days.

This patent is subject to a terminal disclaimer.

(21) Appl. No.: 12/124,029

(22) Filed: May 20, 2008

(65) Prior Publication Data

US 2008/0256126 A1    Oct. 16, 2008

Related U.S. Application Data

(63) Continuation of application No. 10/144,049, filed on May 10, 2002, now Pat. No. 7,406,679.

(51) Int. Cl.
*G06F 9/44* (2006.01)
*G06F 7/00* (2006.01)

(52) U.S. Cl. ......... 717/124; 717/103; 717/115; 707/702

(58) Field of Classification Search .................. None
See application file for complete search history.

(56) References Cited

U.S. PATENT DOCUMENTS

| | | | |
|---|---|---|---|
| 5,745,767 A | 4/1998 | Rosen et al. | |
| 5,754,760 A | 5/1998 | Warfield | |
| 6,002,871 A | 12/1999 | Duggan et al. | |
| 6,006,235 A * | 12/1999 | Macdonald et al. | 707/702 |
| 6,061,517 A * | 5/2000 | House et al. | 717/115 |
| 6,253,368 B1 * | 6/2001 | Nelin et al. | 717/124 |
| 6,324,683 B1 * | 11/2001 | Fuh et al. | 717/124 |
| 6,424,974 B1 | 7/2002 | Cotner et al. | |
| 6,496,833 B1 | 12/2002 | Goldberg et al. | |
| 6,665,626 B2 | 12/2003 | Hsieh et al. | |
| 7,010,546 B1 | 3/2006 | Kolawa et al. | |
| 7,155,426 B2 | 12/2006 | Al-Azzawe | |
| 7,203,927 B2 * | 4/2007 | Al-Azzawe et al. | 717/124 |
| 7,500,225 B2 * | 3/2009 | Khan et al. | 717/124 |
| 7,539,971 B2 * | 5/2009 | Lane et al. | 717/103 |

OTHER PUBLICATIONS

"DB2 Developer Center—The Next Generation AD Tooling for DB2", Al-Azzawe, Jul. 23, 2002, pp. 1-15, <www.ibm.com/developerworks/db2/library/techarticle/0207alazzawe>.*

(Continued)

*Primary Examiner* — Thuy Dao
(74) *Attorney, Agent, or Firm* — Sawyer Law Group, P.C.

(57) ABSTRACT

A system for providing a test environment for database server-side objects persistently stores a profile for a plurality of test runs for database server-side objects, where the profile comprises persistently stored test parameter values, pre-execution scripts, and/or post-execution scripts. Once the profile is created, it can be selected for subsequent test runs for one or more objects. A plurality of profiles for the objects may also be created. The system eliminates the need for a manual set up or destruction of the test environment for each test run, improving efficiency in the development of database server-side objects significantly.

31 Claims, 9 Drawing Sheets

OTHER PUBLICATIONS

"Cross-Platform DB2 Stored Procedures: Building and Debugging", IBM Redbook, May 2001, 568 pages, <http://www.redbooks.ibm.com/redbooks/pdfs/sg245485.pdf>.*

Al-Azzawe, "DB2 Developer Center—The Next Generation AD Tooling for DB2", http:/www.ibm.com/developerworks/db2/library/techarticle/0207alazzawe.html, Jul. 23, 2007, 15 Pages.

IBM "Cross-Platform DB2 Stored Procedures: Building and Debugging", http://publib-b.boulder.ibm.com/Redbooks.nsf, May 8, 2001, 53 Pages.

Cragle et al., "Putting the Wraps on Back Software", http://www.windowsitpro.com/Articles, WindowsITPro, Apr. 1998, 7 Pages.

* cited by examiner

TESTING ENVIRONMENT FOR DATABASE SERVER SIDE LOGIC

CROSS-REFERENCE TO RELATED APPLICATIONS

Under 35 USC §120, this application is a continuation application and claims the benefit of priority to U.S. Pat. No. 7,406,679 issued Jul. 29, 2008, entitled "Testing Environment for Database Server Side Logic", all of which is incorporated herein by reference.

FIELD OF THE INVENTION

The present invention relates to server-side objects, and more particularly to the testing of server-side objects in a database network.

BACKGROUND OF THE INVENTION

An important part of the development of any database server-side object, such as stored procedures, user-defined functions, methods, triggers, or any other type of objects running at the database server. The developer codes the object, builds it at the database server, and tests the execution of the object by performing a test run. For simple objects, the test run includes passing input parameter values to the object, executing the object, and obtaining a result. However, in most cases, the objects are more complicated and require setup in order to more accurately simulate the production environment in which the object will ultimately be executed. The environment to be setup can range from the simple to the complex. For complex environments, the setup could include setting up test data, creating other database artifacts such as regular or temporary tables, setting up database environment properties, such as current schema, function path, etc. Once the environment is set up, the developer can perform the test run and pass input parameters values to the object. At the completion of the test run, the environment typically needs to be destroyed. Sometimes, the developer codes additional procedures or functions for the purpose of setting up or destroying the environment. The developer will likely need to perform multiple test runs in the course of the development of the object.

However, with current development tools, for each test run performed, the developer must manually set up the test environment, manually pass the input parameter values to the object to be tested, and manually destroy the test environment. If additional procedures or functions were coded to set up or destroy the environment, these procedures or functions must be recoded each time a test run is performed. This is cumbersome and time consuming for the developer and negatively impacts the efficiency of the development process.

Accordingly, there exists a need for an improved method and system for providing a test environment for database server-side objects. The present invention addresses such a need.

SUMMARY OF THE INVENTION

A method and system for providing a test environment for database server-side objects persistently stores a profile for a plurality of test runs for database server-side objects, where the profile comprises persistently stored test parameter values, pre-execution scripts, and/or post-execution scripts. Once the profile is created, it can be selected for subsequent test runs for one or more objects. A plurality of profiles for the objects may also be created. The method and system eliminates the need for a manual set up or destruction of the test environment for each test run, improving efficiency in the development of database server-side objects significantly.

DETAILED DESCRIPTION

The present invention provides an improved method and system for providing a test environment for database server-side objects. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention persistently stores a profile for a plurality of test runs for database server-side objects, where the profile comprises persistently stored test parameter values, pre-execution scripts, and/or post-execution scripts. Once the profile is created, it can be selected for subsequent test runs for one or more objects. A plurality of profiles for the objects may also be created.

To more particularly describe the features of the present invention, please refer to FIGS. 1 through 5 in conjunction with the discussion below.

Figure 1:
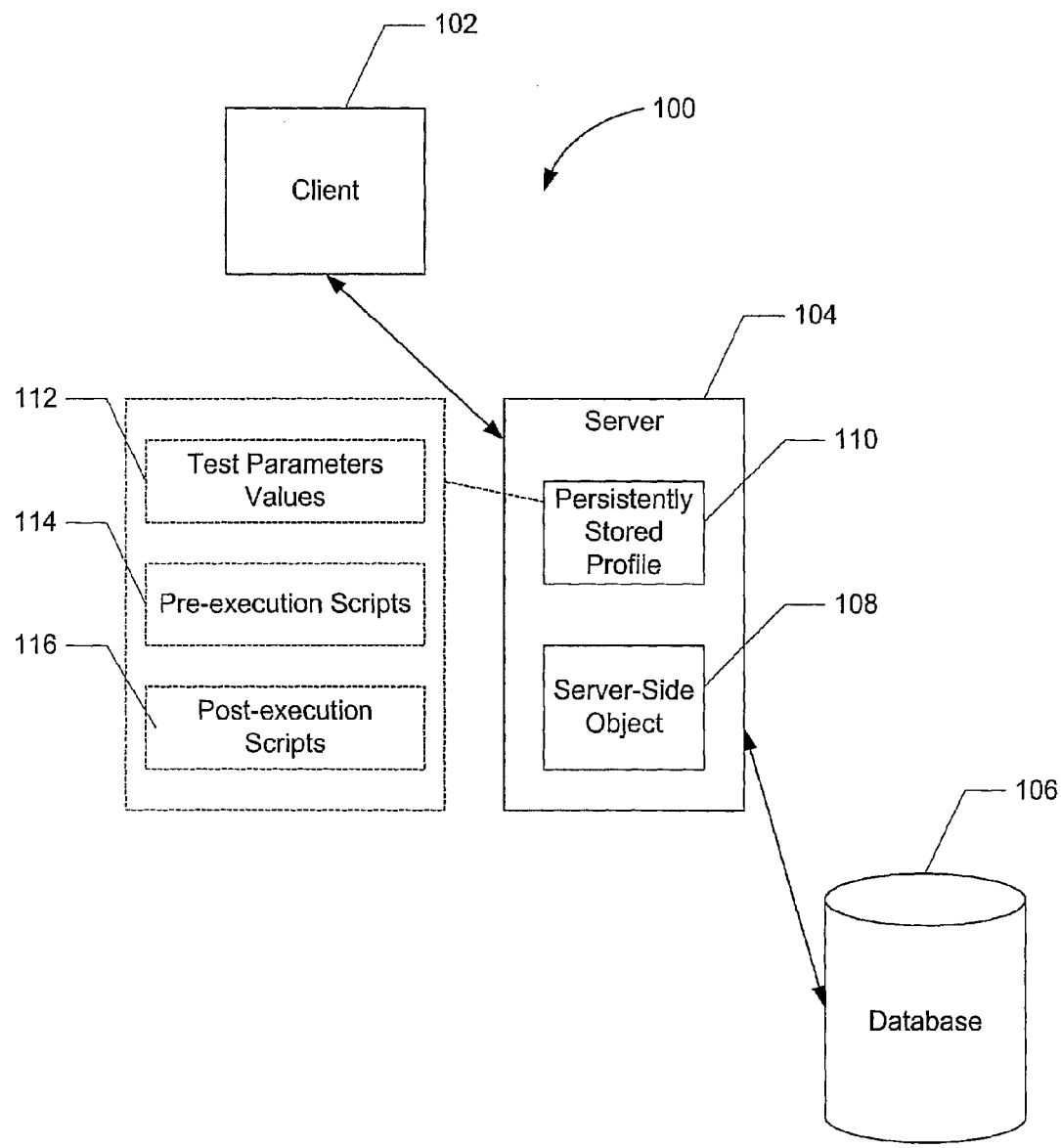
FIG. 1 illustrates a preferred embodiment of a system for providing a test environment for database server-side objects in accordance with the present invention.

FIG. 1 illustrates a preferred embodiment of a system for providing a test environment for database server-side objects in accordance with the present invention. The system 100 comprises a client 102, a server 104, and a database 106. The developer at the client 102 creates a server-side object 108 to run against the database 106. To test the object 108 during development, the developer creates a persistently stored profile 110. In the preferred embodiment, the profile 110 is stored at the server 104, however, the profile 110 may be persistently stored elsewhere, such as at the client 102, without departing from the spirit and scope of the present invention.

The profile 110 defines any combination of input values, commands, or other test settings that are to be executed during a test run. In the preferred embodiment, the profile comprises test parameter values 112, pre-execution scripts 114, and/or post-execution scripts 116, which are also stored persistently.

Test parameter values 112 comprise input parameters values to be passed to the object 108 during execution. Pre-execution scripts 114 comprise scripts that set up the testing environment prior to the test run of the object 108. The setup could include setting up test data, creating other database artifacts such as regular or temporary tables, setting up database environment properties, such as current schema, function path, etc. Post-execution scripts 116 comprise scripts that "clean up" or destroy the test environment once the test run of the object 108 has completed. More than one profile for the object 108 can be persistently stored. Because the profile 110 is persistently stored, it can be used for a plurality of test runs of the object 108. In the preferred embodiment, the server 104 comprises software that assists the developer in creating a persistently stored profile 110.

Figure 2:
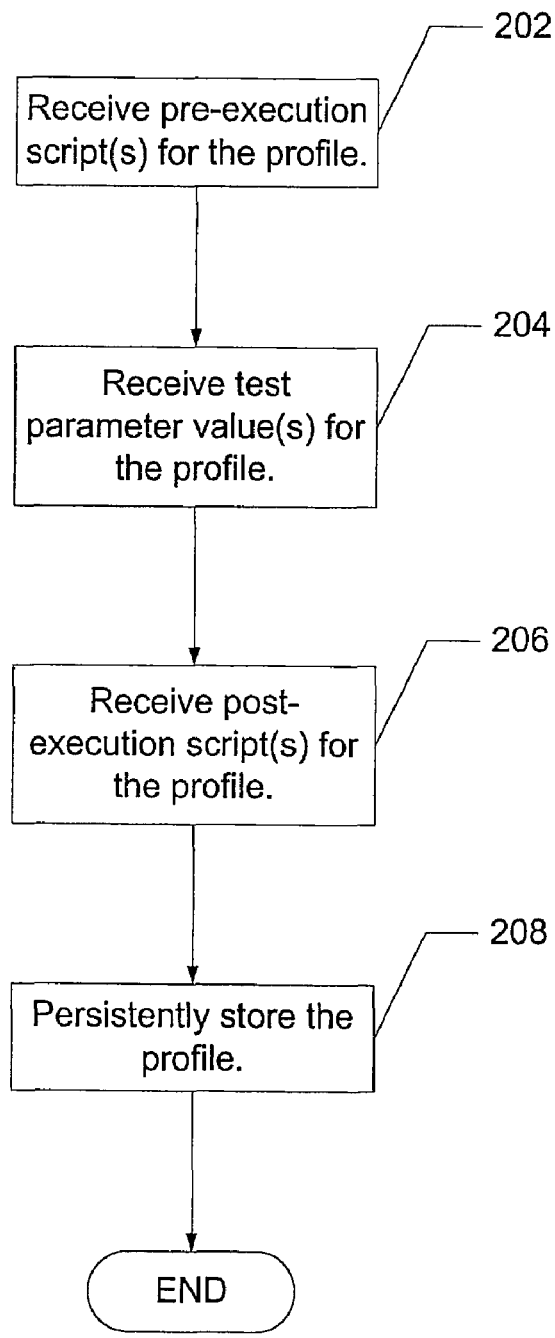
FIG. 2 is a flowchart illustrating a preferred embodiment of a method for creating a persistently stored profile for the test environment for database server-side objects in accordance with the present invention.

FIG. 2 is a flowchart illustrating a preferred embodiment of a method for creating a persistently stored profile for the test environment for database server-side objects in accordance with the present invention. The developer can choose to define test parameter values 112, pre-execution scripts 114, and/or post-execution scripts 116. If the developer creates pre-execution script(s), then the server 104 receives one or more pre-execution scripts 114 for the profile 110, via step 202. If the developer defines test parameter values, then the server 104 receives the test parameter values 112 for the profile 110, via step 204. If the developer creates post-execution script(s), then the server 104 receives one or more post-execution scripts 116 for the profile 110, via step 206. Once the test parameter values 112, pre-execution script(s) 114, and/or post-execution script(s) 116 are received for the profile 110, the profile 110 is persistently stored, via step 208. The profile 110 can now be used for test runs of the object 108.

Figure 3A:
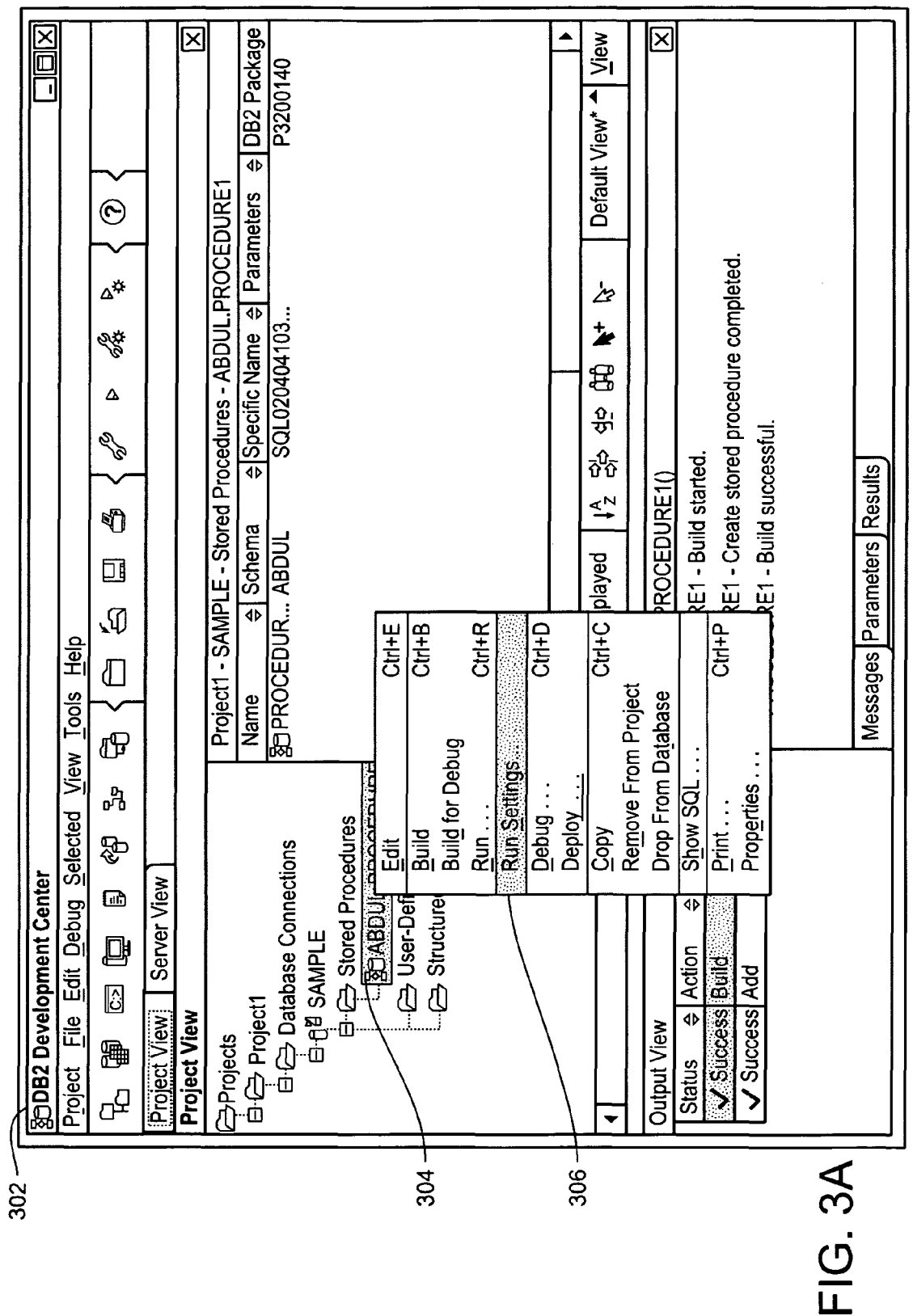
FIGS. 3A-3E illustrate an example user interface for creating a persistently stored profile for the test environment for database server-side objects in accordance with the present invention.
Figure 3B:
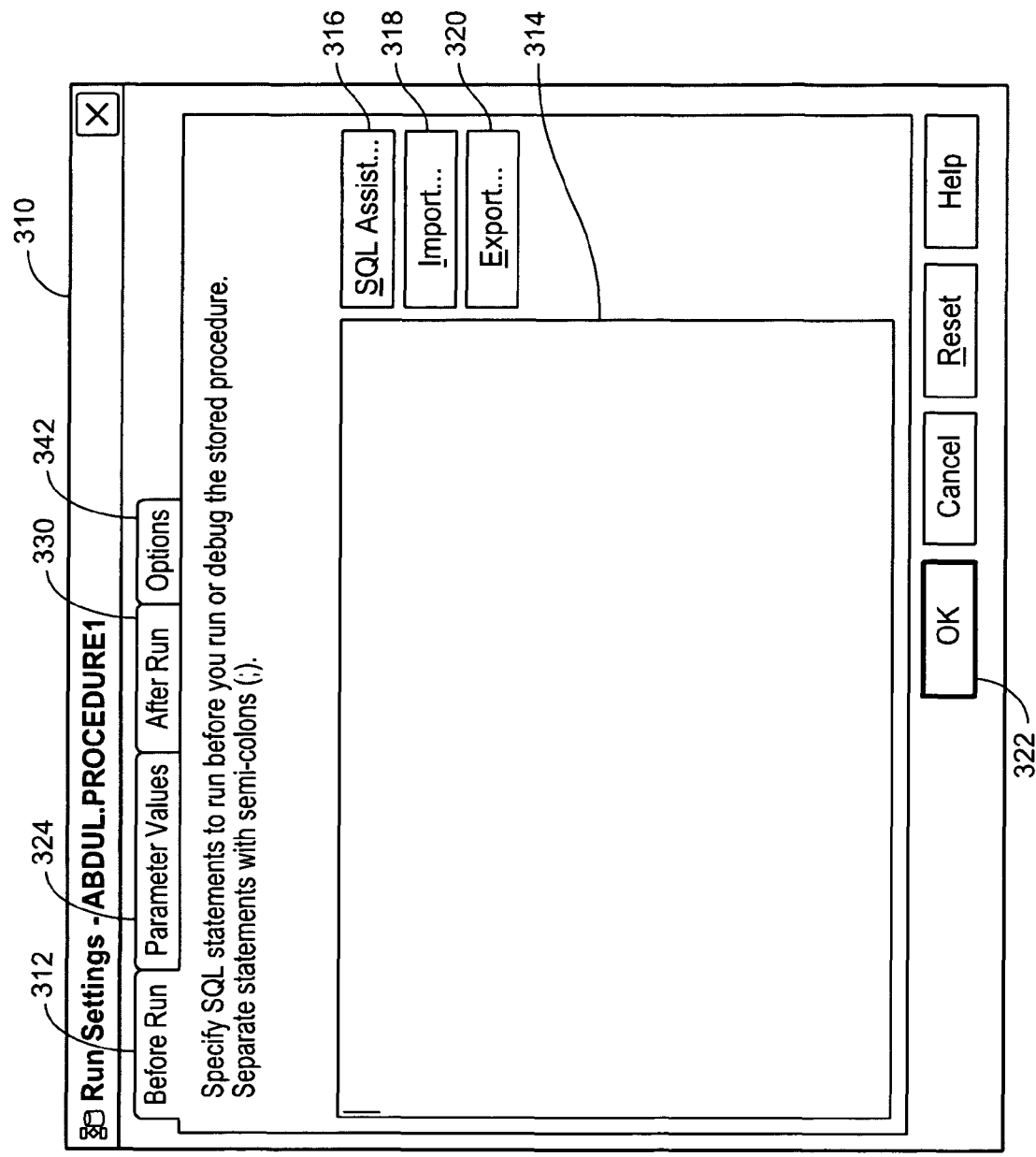

FIGS. 3A-3E illustrate an example user interface for creating a persistently stored profile for the test environment for database server-side objects in accordance with the present invention. In this example, the user interface is part of the DB2 Development Center™ from International Business Machines Corporation™. As illustrated in FIG. 3A, the Project View window 302 of DB2 Development Center displays the server-side object(s) in development. For example, a stored procedure 304 is being developed. To set up a profile 110 for a test run of the stored procedure 304, "Run Settings" 306 is selected from a menu. As illustrated in FIG. 3B, a "Run Settings" window 310 is then displayed. The "Run Settings" window 310 comprises several tabs: a "Before Run" tab 312, a "Parameter Values" tab 324, an "After Run" tab 330, and an optional "Options" tab 342.

As illustrated in FIG. 3B, under the "Before Run" tab 312, one or more pre-execution Structured Query Language (SQL) scripts 114 for the profile 110 can be specified in the input field 314, via step 202, to be run before running or debugging the stored procedure 304. By selected the "SQL Assistant" button 316, a SQL Assistant (not shown) can be displayed to assist the developer in creating the pre-execution SQL scripts. Shared pre-execution SQL scripts can be imported into the input field 314 by selecting the "Import" button 318. The pre-execution SQL scripts 114 created for the profile 110 can be shared with other profiles by selecting the "Export" button 320. Once the pre-execution SQL scripts 114 have been created, the "OK" button 322 is selected, and the pre-execution SQL scripts 114 are persistently stored as part of the profile 110.

Figure 3C:
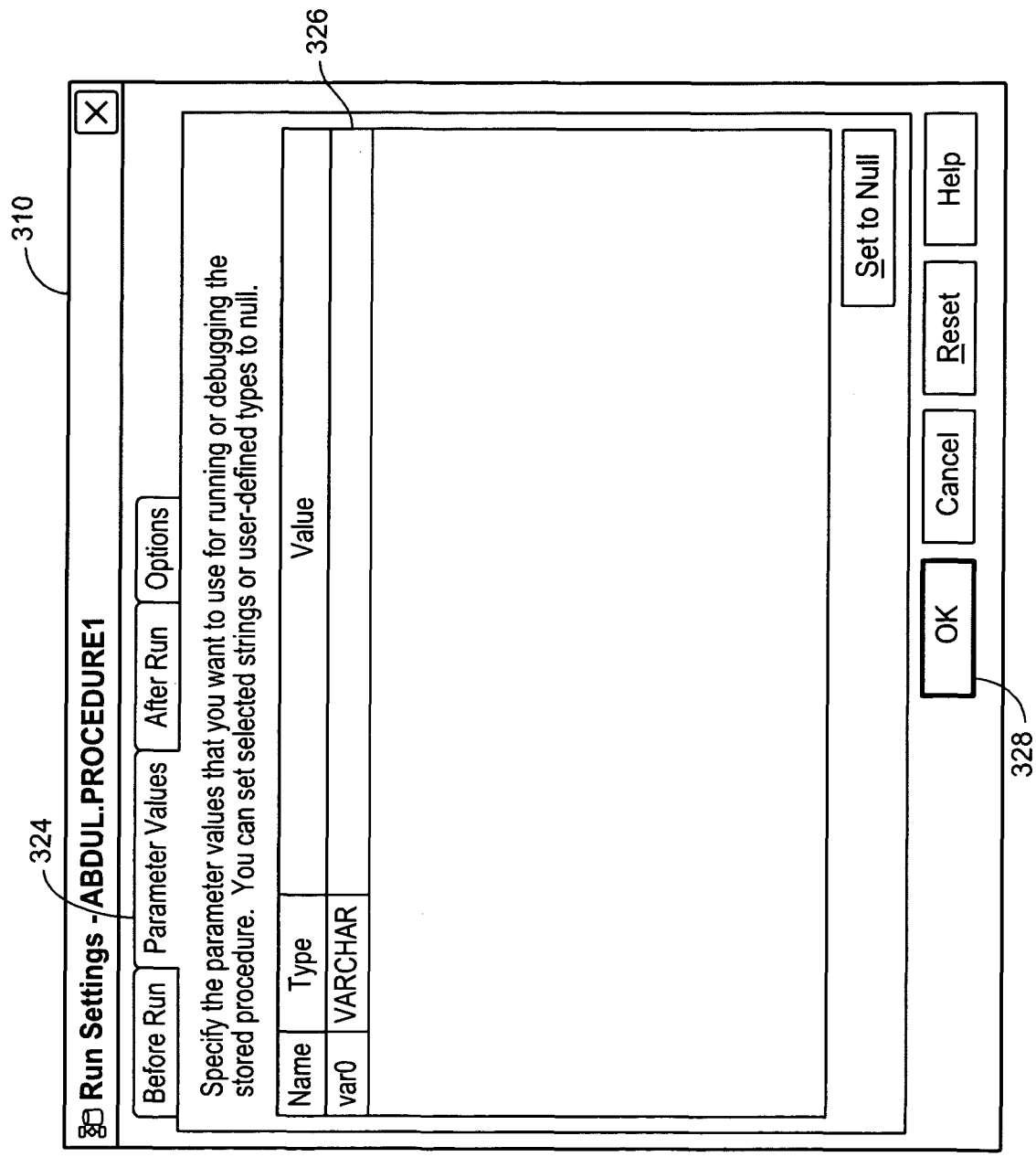

As illustrated in FIG. 3C, under the "Parameter Values" tab 324, the values 112 for one or parameters for the profile 110 can be specified in the Value field 326, via step 204, to be input into the stored procedure 304 during its test run. Once the parameter values 112 have been created, the "OK" button 328 is selected, and the parameter values 112 are persistently stored as part of the profile 110.

Figure 3D:
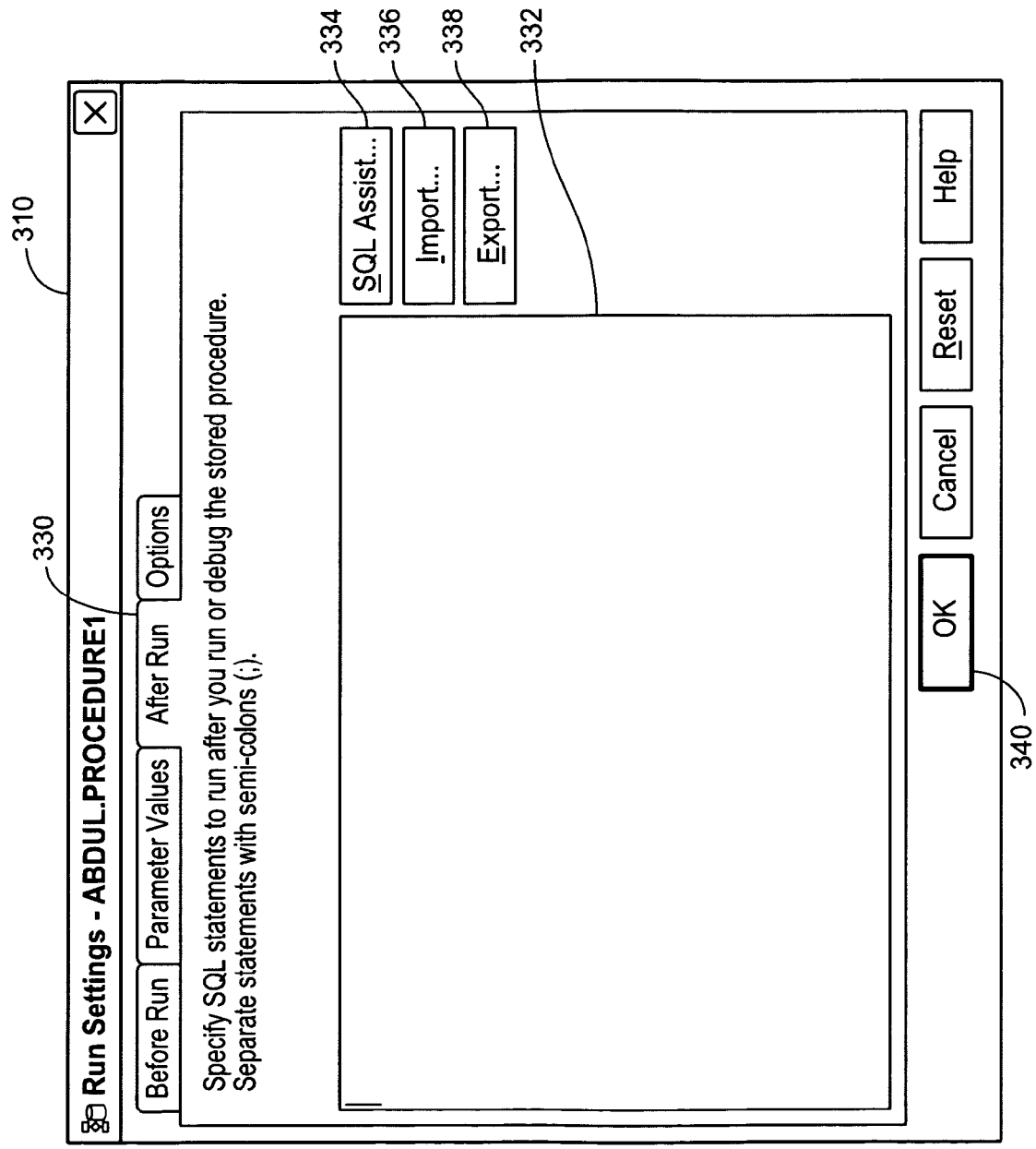

As illustrated in FIG. 3D, under the "After Run" tab 330, one or more post-execution SQL scripts 116 for the profile 110 can be specified in the input field 332, via step 206, to be run after running or debugging the stored procedure 304. By selected the "SQL Assistant" button 334, the SQL Assistant (not shown) can be displayed to assist the developer in creating the SQL scripts. Shared post-execution SQL scripts can be imported into the input field 332 by selecting the "Import" button 336. The post-execution SQL scripts 116 created for the profile 110 can be shared with other profiles by selecting the "Export" button 338. Once the post-execution SQL scripts 116 have been created, the "OK" button 340 is selected, and the post-execution SQL scripts 116 are persistently stored as part of the profile 110.

Figure 3E:
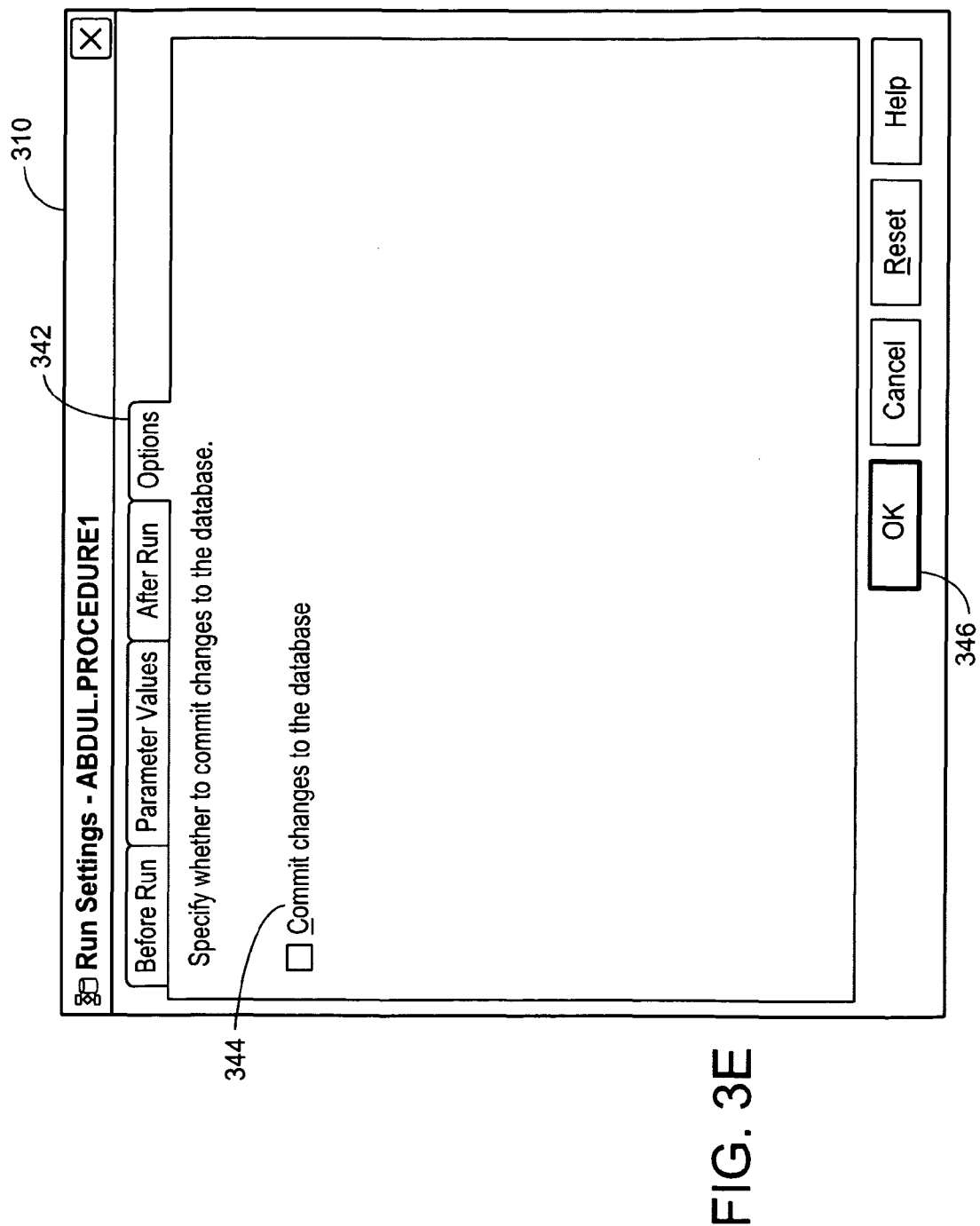

Optionally, as illustrated in FIG. 3E, the "Run Settings" window 310 can comprise an "Options" tab 342. Under the "Options" tab 342, various items can be listed. For example, the option 344 to commit the changes to the database can be selected to occur as part of the profile 110. Once the desired options are selected, the "OK" button 346 is selected, and the selected options are persistently stored as part of the profile 110.

Once the persistently stored profile 110 has been created, it can be selected for test runs of the object 108.

Although the present invention is described above with the user interface and tabs illustrated above, one of ordinary skill in the art will understand that other user interfaces and/or tabs may be used without departing from the spirit and scope of the present invention.

Figure 4:
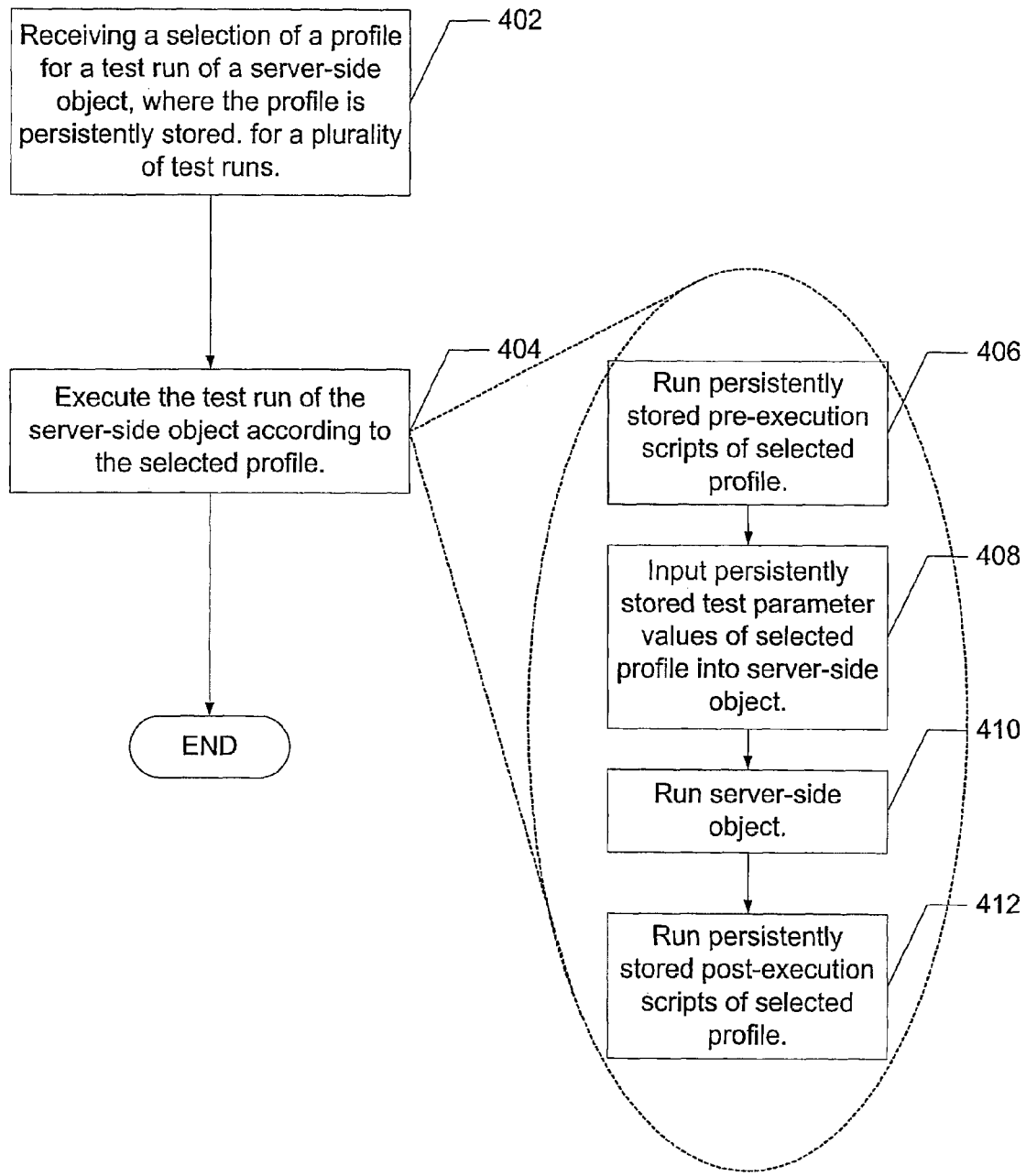
FIG. 4 is a flowchart illustrating a preferred embodiment of a method for executing a test run of a database server-side object in accordance with the present invention.

FIG. 4 is a flowchart illustrating a preferred embodiment of a method for executing a test run of a database server-side object in accordance with the present invention. First, a selection of a profile 110 is received for a test run of a database object 108, where the profile 110 is persistently stored for a plurality of test runs, via step 402. The test run of the object 108 is then executed according to the selected profile 110, via step 404.

In our example above, the selected profile 110 comprises test parameter values 112, pre-execution scripts 114, and post-execution scripts 116 as defined above. When the test run is executed, via step 404, the persistently stored pre-execution scripts 114 of the selected profile 110, created under the "Before Run" tab 312, are first run to set up the test environment, via step 406. Next, the persistently stored test parameter values 112 of the selected profile 110, created under the "Parameter Values" tab 324, are input into the object 108, via step 408. The object 108 is then run, via step 410. Then, the persistently stored post-execution scripts 116 of the selected profile 110, created under the "After Run" tab 330, are run to destroy the test environment, via step 412.

Figure 5:
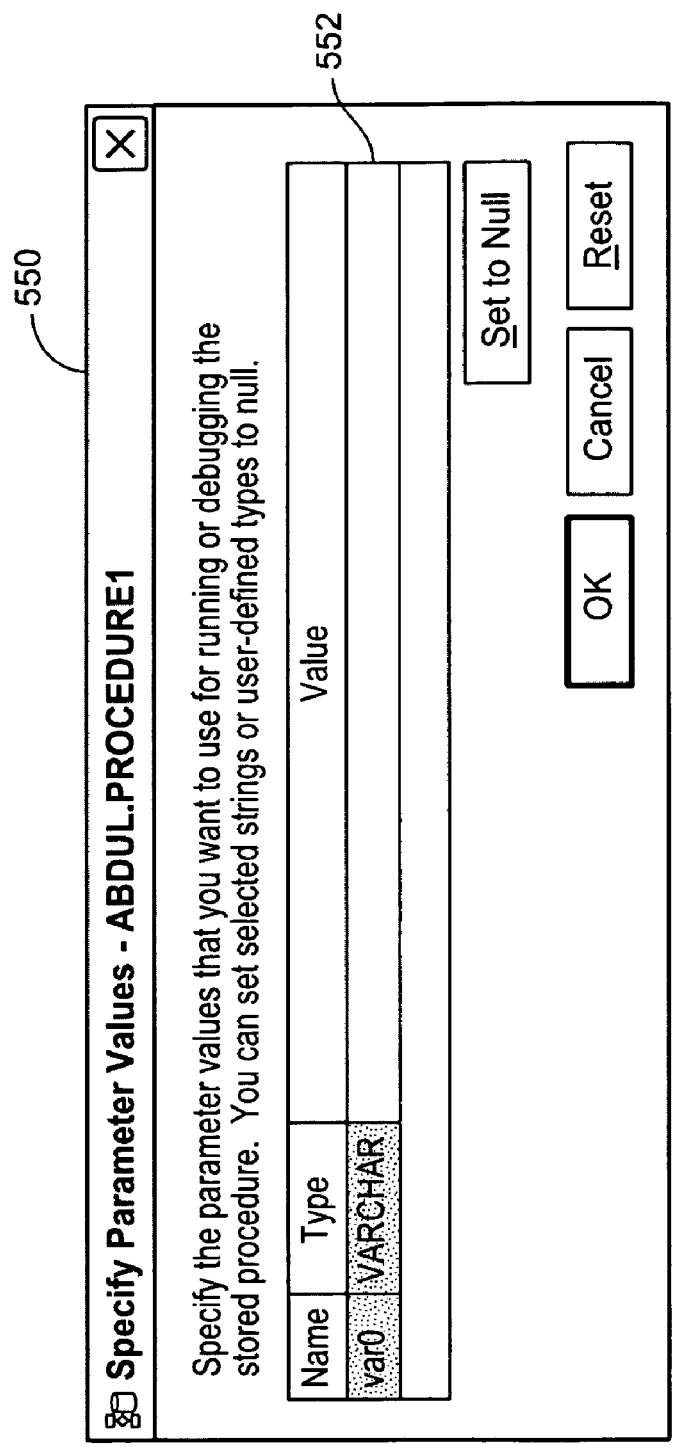
FIG. 5 illustrates an optional parameter values window of the example user interface for executing a test run of a database server-side object in accordance with the present invention.

Optionally, as illustrated in FIG. 5, prior to the execution of the object 108, via step 410, a "Specify Parameter Values" window 550 can be displayed to allow last minute changes to the parameter values 112. New values can be entered in the Value field 552.

Because the profile 110, and its parts 112-116, are persistently stored, it can be used in multiple test runs of the object 108 without requiring manual set up or destruction of the test environment for each test run. The same profile 110 can be used to test the object 108 in various stages of development. The profile 110 can be modified at different stages as well, and used multiple times. The profile 110 can also be used to test run different objects. In addition, a plurality of profiles 110 can be created for the same purposes.

An improved method and system for providing a test environment for database server-side objects have been disclosed. The method and system in accordance with the present invention persistently stores a profile for a plurality of test runs for database server-side objects, where the profile comprises persistently stored test parameter values, pre-execution scripts, and/or post-execution scripts. Once the profile is created, it can be selected for subsequent test runs for one or more objects. A plurality of profiles for the objects may also be created. The present invention eliminates the need for a manual set up or destruction of the test environment for each test run, improving efficiency in the development of database server-side objects significantly.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system comprising:
    a server, the server comprising a database object and a central processing unit; and
    a profile for a test run of the database object, the profile comprising:
        at least one parameter,
        at least one test value for the at least one parameter, the at least one test value to be passed to the database object during the test run, and
        at least one pre-execution script to be executed prior to execution of the database object in the test run,
    wherein the profile is persistently stored across multiple test runs of the database object.

2. The system of claim 1, wherein the profile defines a combination of values, commands, or other test settings that are to be used during the test run.

3. The system of claim 1, wherein the at least one pre-execution script comprises at least one Structured Query Language (SQL) statement.

4. The system of claim 1, wherein the profile further comprises at least one post-execution script to be executed after execution of the database object in the test run.

5. The system of claim 4, wherein the at least one post-execution script comprises at least one SQL statement.

6. The system of claim 4, wherein the at least one post-execution script cleans up or destroys a test environment for the test run of the database object.

7. The system of claim 1, wherein the profile is utilized for a plurality of test runs of the database object.

8. The system of claim 1, further comprising a plurality of profiles for a plurality of test runs of the database object.

9. The system of claim 1, wherein the profile is persistently stored at the server.

10. The system of claim 1, wherein the at least one pre-execution script sets up a testing environment for the test run of the database object.

11. A non-transitory computer readable medium storing a computer program for providing a test environment for a database object, the computer program comprising instructions for:
    (a) receiving a profile for a test run of the database object, the profile comprising:
        at least one parameter,
        at least one test value for the at least one parameter, the at least one test value to be passed to the database object during the test run, and
        at least one pre-execution script to be executed prior to execution of the database object in the test run; and
    (b) persistently storing the profile across multiple test runs of the database object.

12. The medium of claim 11, wherein the profile defines a combination of values, commands, or other test settings that are to be used during the test run.

13. The medium of claim 11, wherein the at least one pre-execution script comprises at least one SQL statement.

14. The medium of claim 11, wherein the profile further comprises at least one post-execution script to be executed after execution of the database object in the test run.

15. The medium of claim 14, wherein the at least one post-execution script comprises at least one SQL statement.

16. The medium of claim 14, wherein the at least one post-execution script cleans up or destroys a test environment for the test run of the database object.

17. The medium of claim 11, further comprising:
    (c) receiving a selection of the persistently stored profile for the test run; and
    (d) executing the test run of the database object according to the selected profile.

18. The medium of claim 17, wherein the executing instruction (d) comprises:
    (d1) executing the at least one pre-execution script of the selected profile; and
    (d2) executing the database object.

19. The medium of claim 17, wherein the executing instruction (d) comprises:
    (d1) inputting the at least one test value of the selected profile into the database object; and
    (d2) executing the database object.

20. The medium of claim 17, wherein the executing instruction (d) comprises:
    (d1) executing the database object; and
    (d2) executing at least one post-execution script of the selected profile.

21. A non-transitory computer readable medium storing a computer program for providing a test environment for a database object, the computer program comprising instructions for:
    (a) receiving at least one pre-execution script for a profile for a test run of the database object, the at least one pre-execution script to be executed prior to execution of the database object in the test run;
    (b) receiving at least one test value for at least one parameter of the profile, the at least one test value to be passed to the database object during the test run;
    (c) receiving at least one post-execution script for the profile, the at least one post-execution script to be executed after execution of the database object in the test run; and
    (d) persistently storing the profile across multiple test runs of the database object.

22. The medium of claim 21, wherein the computer program further comprises instructions for:
    (e) receiving a selection of the persistently stored profile for the test run; and
    (f) executing the test run of the database object according to the selected profile.

23. The medium of claim 22, wherein the executing instruction (f) comprises:
- (f1) executing the at least one pre-execution script of the selected profile;
- (f2) inputting the at least one test value of the selected profile into the database object;
- (f3) executing the database object; and
- (f4) executing the at least one post-execution script of the selected profile.

24. The medium of claim 21, wherein the at least one pre-execution script sets up a testing environment for the test run of the database object.

25. The medium of claim 21, wherein the at least one post-execution script cleans up or destroys a test environment for the test run of the database object.

26. A non-transitory computer readable medium storing a computer program for performing a test run of a database object, the computer program comprising instructions for:
- (a) receiving a selection of a profile for the test run of the database object, the selected profile comprising:
  - at least one parameter,
  - at least one test value for the at least one parameter, the at least one test value to be passed to the database object during the test run, and
  - at least one pre-execution script to be executed prior to execution of the database object in the test run,
  wherein the profile is persistently stored across multiple test runs of the database object; and
- (b) executing the test run of the database object according to the selected profile.

27. The medium of claim 26, wherein the selected profile defines a combination of values, commands, or other test settings that are to be used during the test run.

28. The medium of claim 26, wherein the selected profile further comprises at least one post-execution script to be executed after execution of the database object in the test run.

29. The medium of claim 28, wherein the executing instruction (b) comprises:
- (b1) executing the at least one pre-execution script of the selected profile;
- (b2) inputting the at least one test value of the selected profile into the database object;
- (b3) executing the database object; and
- (b4) executing the at least one post-execution script of the selected profile.

30. The medium of claim 28, wherein the at least one post-execution script cleans up or destroys a test environment for the test run of the database object.

31. The medium of claim 26, wherein the at least one pre-execution script sets up a testing environment for the test run of the database object.

* * * * *